(12) United States Patent
Nunes et al.

(10) Patent No.: US 12,606,286 B1
(45) Date of Patent: Apr. 21, 2026

(54) METHOD AND APPARATUS FOR MAKING A SOFT ROBOTIC MARINE ANIMAL

(71) Applicant: The United States of America, as represented by the Secretary of the Navy, Arlington, VA (US)

(72) Inventors: Jennifer M. Nunes, Cabin John, MD (US); Christopher M. Nunes, Cabin John, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 93 days.

(21) Appl. No.: 18/911,023

(22) Filed: Oct. 9, 2024

Related U.S. Application Data

(62) Division of application No. 17/568,449, filed on Jan. 4, 2022, now Pat. No. 12,116,094.

(60) Provisional application No. 63/134,146, filed on Jan. 5, 2021.

(51) Int. Cl.
| | |
|---|---|
| B63G 8/00 | (2006.01) |
| B29C 33/00 | (2006.01) |
| B29C 33/42 | (2006.01) |
| B29D 99/00 | (2010.01) |
| B63G 8/08 | (2006.01) |
| B63H 1/37 | (2006.01) |

(52) U.S. Cl.
CPC ............ B63G 8/001 (2013.01); B29C 33/005 (2013.01); B29C 33/42 (2013.01); B29D 99/0007 (2013.01); B63G 8/08 (2013.01); B63H 1/37 (2013.01); *B63G 2008/002* (2013.01)

(58) Field of Classification Search
CPC .... B63G 8/001; B63G 8/08; B63G 2008/002; B29C 33/005; B29C 33/42; B29D 99/0007; B63H 1/37
See application file for complete search history.

(56) References Cited

U.S. PATENT DOCUMENTS

| | | | | |
|---|---|---|---|---|
| 7,785,098 B1* | 8/2010 | Appleby | ................ | G21K 1/025 |
| | | | | 264/319 |
| 2010/0196637 A1* | 8/2010 | Lippert | ................... | F16C 7/026 |
| | | | | 428/36.1 |
| 2013/0078345 A1* | 3/2013 | Bender | .................. | A21B 3/132 |
| | | | | 426/514 |

(Continued)

*Primary Examiner* — Alison L Hindenlang
*Assistant Examiner* — Shibin Liang
(74) *Attorney, Agent, or Firm* — Howard Kaiser; Jesus J. Hernandez; U.S. Department of the Navy, Office of the General Counsel

(57) ABSTRACT

An exemplary inventive molding device includes two mold components characterized by matching rounded-star shapes. Each mold component includes eight congruent rounded-tip projections and eight congruent apertured sections separated from each other by the projections and describing a ring shape. The projections correspond to the equiangular points of a star. Each section has a medial hole and is interposed between and connects two projections. The mold components are joined so that their respective projections and holes are even with each other and fasteners are installed through the holes. Appropriate introduction and curing of a castable material inside the joined mold components produces a flexible device suitable for use as part of a biomimicking soft robot.

7 Claims, 15 Drawing Sheets

(56) References Cited

U.S. PATENT DOCUMENTS

2015/0157028 A1* 6/2015 Wirth .................... A21B 3/132
426/512

* cited by examiner

METHOD AND APPARATUS FOR MAKING A SOFT ROBOTIC MARINE ANIMAL

CROSS-REFERENCE TO RELATED APPLICATIONS

This patent application is a divisional of U.S. nonprovisional patent application Ser. No. 17/568,449, filed 4 Jan. 2022, hereby incorporated herein by reference, which claims the benefit of U.S. provisional patent application No. 63/134,146, filed 5 Jan. 2021, hereby incorporated herein by reference.

STATEMENT OF GOVERNMENT INTEREST

The inventorship of the invention described herein includes at least one person who invented the invention in performance of the person's official duties as an employee of the United States Department of the Navy. The invention may be manufactured, used, and licensed by or for the Government of the United States of America for governmental purposes without payment of any royalties thereon or therefor. The Government of the United States of America has ownership rights in the invention.

BACKGROUND OF THE INVENTION

The present invention relates to biomimetrics, more particularly to methods, apparatuses, and systems pertaining to biometric mimicry or imitation of natural sea creatures, such as jellyfish, that swim or float in or on water.

A fascinating premise of the science of biomimetrics is that nature's animals have evolved in proficient ways that are worthy of mimicry by humankind. In recent years a great deal of biomimetric investigation has been directed toward research and development of soft robots suitable for free-swimming operation in marine environments.

Among the various bio-inspirational marine animals that have been studied in such biometric efforts, jellyfish have been a prominent subject of biological mimicry. Jellyfish are marine animals that gracefully and efficiently move through water. Although these marine animals have traditionally been referred to as "jellyfish," technically speaking they are invertebrate animals and hence are not "fish" (which are vertebrate animals). A typical jellyfish propels itself through the water by alternately contracting and relaxing musculature contained in the "bell" body portion of the jellyfish.

Hereby incorporated herein by reference is the following master of science thesis authored by present inventor Jennifer M. Nunes (née Frame): Jennifer Frame, "Self-Contained Soft Robotic Jellyfish with Water-Filled Bending Actuators and Positional Feedback Control," a Thesis Submitted to the Faculty of The College of Engineering and Computer Science in Partial Fulfillment of the Requirements for the Degree of Master of Science, Florida Atlantic University, Boca Raton, Florida, thesis dated August 2016. In the course of her Master's Degree research, present inventor Jennifer M. Nunes created in 2016 a device that she dubbed "JenniFish," a free-swimming self-contained robotic jellyfish-like vehicle.

See also the following paper, hereby incorporated herein by reference, co-authored by present inventor Jennifer M. Nunes: Jennifer Frame, Nick Lopez, Oscar Cure and Erik D. Engeberg, "Thrust Force Characterization of Free-Swimming Soft Robotic Jellyfish," *Bioinspiration & Biomimetics* 13 064001, published 18 Sep. 2018.

Also of interest is the following master of science thesis, hereby incorporated herein by reference: Daniel Luvisi, "Free Swimming Soft Robotic Jellyfish with Adaptive Depth Control," a Thesis Submitted to the Faculty of the College of Engineering and Computer Science in Partial Fulfillment of the Requirements for the Degree of Master of Science, Florida Atlantic University, Boca Raton, Florida, thesis dated May 2019.

In addition, the following paper is pertinent to the instant disclosure and is hereby incorporated herein by reference: J. C. Nawroth, H. Lee, A. W. Feinberg, C. M. Ripplinger, M. L. McCain, A. Grosberg, J. O. Dabiri, and K. K. Parker, "A Tissue-Engineered Jellyfish with Biomimetic Propulsion," *Nature Biotechnology*, Vol. 30, No. 8, pages 792-800 (2012).

SUMMARY OF THE INVENTION

An object of the present invention is to provide a better methodology for producing self-contained soft-actuated robotic devices or systems that biometrically mimic specific animals in the animal kingdom, such as jellyfish or other types of marine animals.

The present inventors, with the assistance of colleagues, were instrumental in bringing soft robotics to the United States Navy's STEM (Science, Technology, Engineering, Mathematics) outreach endeavor. The U.S. Navy's STEM soft robotics project emphasized, and continues to emphasize, the present inventors' SeaJelly® jellyfish-like device. During the course of the STEM SeaJelly project, the present inventors have made improvements to the manufacturing techniques used to fabricate the soft actuators that make up the vehicle tentacles.

The term "SeaJelly" is used herein to generally and exemplarily refer to a jellyfish-like vehicle that is variously embodied in accordance with the present invention. The United States Department of the Navy is owner of a service mark registered by the United States Patent and Trademark Office, Registration No. 6169336, Registration Date 6 Oct. 2020. As described by the trademark registration, the mark "consists of the wording 'SEA JELLY' with a jellyfish resting on the top of the 'J'."

The U.S. Navy's Naval Sea Systems Command (NAVSEA) SeaJelly STEM homepage states: "Build your own free-swimming biomimetic platform with help from the Navy's first soft robotics STEM initiative. The SeaJelly project includes open-source CAD and PCB designs, Arduino code, build instructions, and reference materials. It is a great way to learn new concepts, gain hands-on experience, and encourage creativity. After your first build, try modifying parts of the design or exploring different SeaJelly applications—such as citizen science! JenniFish, a master's thesis research prototype, was used as the foundation for SeaJelly. Have fun naming your own SeaJelly variant! Feel free to send comments, ask questions, and contribute new ideas by email to [the NAVSEA SeaJelly webpage]."

According to exemplary inventive practice, an inventive apparatus for casting an object includes two mold components having matching stelliform peripheries. Each mold component is characterized by a geometric center and includes at least three mold projections corresponding to the equiangular points of a stellar geometry. Each mold component further includes at least three attachment members defining an annulus characterized by the same geometric center. The at least three attachment members are spaced equidistantly about the annulus. Each attachment member connects two mold projections and has a through-hole provided therein. The two mold components are congruously coupled wherein the respective geometric centers, mold projections, and through-holes are in alignment. The inventive apparatus further includes at least three fasteners, wherein each aligned pair of the respective through-holes has a fastener associated therewith. The cast object may be suitable for use in effecting soft robotic biomimicry of a biological entity such as a jellyfish or other sea animal.

The present invention's SeaJelly robotic device bears some similarity to the aforementioned JenniFish robotic device, which was the noteworthy brainchild of present co-inventor Jennifer M. Nunes, who authored the aforementioned master's thesis entitled "Self-Contained Soft Robotic Jellyfish with Water-Filled Bending Actuators and Positional Feedback Control." Vis-à-vis the JenniFish and other previous efforts in the art, the present invention features several improvements with respect to fabrication and configuration. For instance, exemplary inventive practice features novel soft actuators characterized by improved manufacturability. Some of the new features of the present invention can serve to augment repeatability of procedures and to simplify overall processing (e.g., in terms of time, material, manual dexterity, and other requirements). Exemplary inventive practice affords, inter alia, reductions in material waste as well as reductions in materials, skillsets, and tool calibers required for assembly.

The original JenniFish, as disclosed by present inventor Jennifer M. Nunes in her aforementioned master's thesis (entitled "Self-Contained Soft Robotic Jellyfish with Water-Filled Bending Actuators and Positional Feedback Control"), references Harvard's three-part molding methods for fabricating pneumatic network ("PneuNet") actuators used in the soft actuator elements. See B. Mosadegh, P. Polygerinos, C. Keplinger, S. Wennstedt, R. F. Shepherd, U. Gupta, J. Shim, K. Bertoldi, C. J. Walsh and G. M. Whitesides, "Pneumatic Networks for Soft Robotics that Actuate Rapidly," *Advanced Functional Materials*, Vol. 24, No. 15, pages 2163-2170 (2014), hereby incorporated herein by reference. The present invention's SeaJelly improves upon the JenniFish PneuNet molding procedures with respect to both form and function.

The SeaJelly STEM program has made JenniFish-type electronics user-friendly for a wider audience through various novel characteristics and adjustments relating to parts and components of soft robots and manufacture thereof. These new attributes of soft robotic jellyfish-like creatures and their fabrication include but are not limited to sourcing overlap with the U.S. Department of the Navy's SeaGlide®, and through-hole soldering footprints that reduce requirements pertaining to skill and tool caliber. Notable is the "SeaJelly Project Guide," which is part of the aforementioned U.S. provisional patent application No. 63/134,146 and is available via the NAVSEA SeaJelly webpage. The "SeaJelly Project Guide" teaches electromechanical vehicle fundamentals and explains SeaJelly® with respect to, inter alia, manufacture and circuitry. In contrast to existing U.S. Navy STEM robotics teaching platforms (such as SeaPerch® and SeaGlide®), SeaJelly® STEM focuses on soft robotic biomimetic underwater locomotion. Parts used for various STEM projects are designed to overlap so as to reinforce concepts and simplify sourcing.

The JenniFish is a free-swimming, self-contained soft robotic vehicle utilizing PneuNet actuators inflated with water from their operating environment. The present inventors' SeaJelly device operates on same or similar principles as the JenniFish device. Water is pumped into internal chambers having dividers allowing for dual actuation with two pumps. However, the inventive SeaJelly molds improve upon several manufacturing and design aspects of the biomimetric robotic device. Notable features of exemplary inventive practice include: (i) uniquely rounded mold elements for producing uniquely rounded actuators; (ii) bolted connections between two major mold components; (iii) an interference fit between said two major mold components; (iv) integrated pump tubes; (v) a cast gasket; (vi) electronics simplification.

According to an exemplary inventive method for making a soft robotic jellyfish, rounded mold elements are implemented for purposes of casting the SeaJelly's actuators. The rounded mold elements are characterized by curvature or curvilinearity of edges, corners, and internal chambers and surfaces. The rounded mold elements, with their "soft" junctures, attribute reduced stress and improved form to the actuators. Bolted connections between two major mold components result in a reduction of material waste and an increase in casting repeatability. An interference fit is provided between the two major mold components for casting the eight-actuator unit. The interference fit reduces material waste and increases repeatability during casting. An integrated tube connects a fluid (e.g., silicone) supply to each actuator. The integrated pump tubes reduce the likelihood of malfunction due to separation and involve fewer components. A cast gasket improves sealing repeatability and involves fewer components. The simplified electronics facilitate practice and understanding by students with respect to the self-contained functionality of the biomimetric robotic device, and afford parts that overlap with those used in other U.S. Navy STEM projects.

The methods and elements of exemplary inventive practice may be practiced in a variety of applications other than those involving jellyfish-like soft robotics. For instance, exemplary inventive practice of fabricating a SeaJelly 3D-printed pressure vessel, and/or of effecting SeaJelly propulsion, can be applied in other vehicles and actuators. In addition, inventive molding methods can be effected for making multifarious kinds of devices.

BRIEF DESCRIPTION OF THE DRAWINGS

The present invention will now be described, by way of example, with reference to the accompanying drawings, wherein like numbers indicate same or similar parts or components, and wherein:

FIG. 14 shows, via concentric dotted geometric lines, the equally spaced (e.g., equiangular) circular arrangement of the congruous attachment members. For illustrative purposes, the attachment members shown in FIGS. 13 and 14 may be considered to represent those shown in either FIG. 11 or FIG. 12.

DESCRIPTION OF EXEMPLARY EMBODIMENTS OF THE INVENTION

Figure 1:
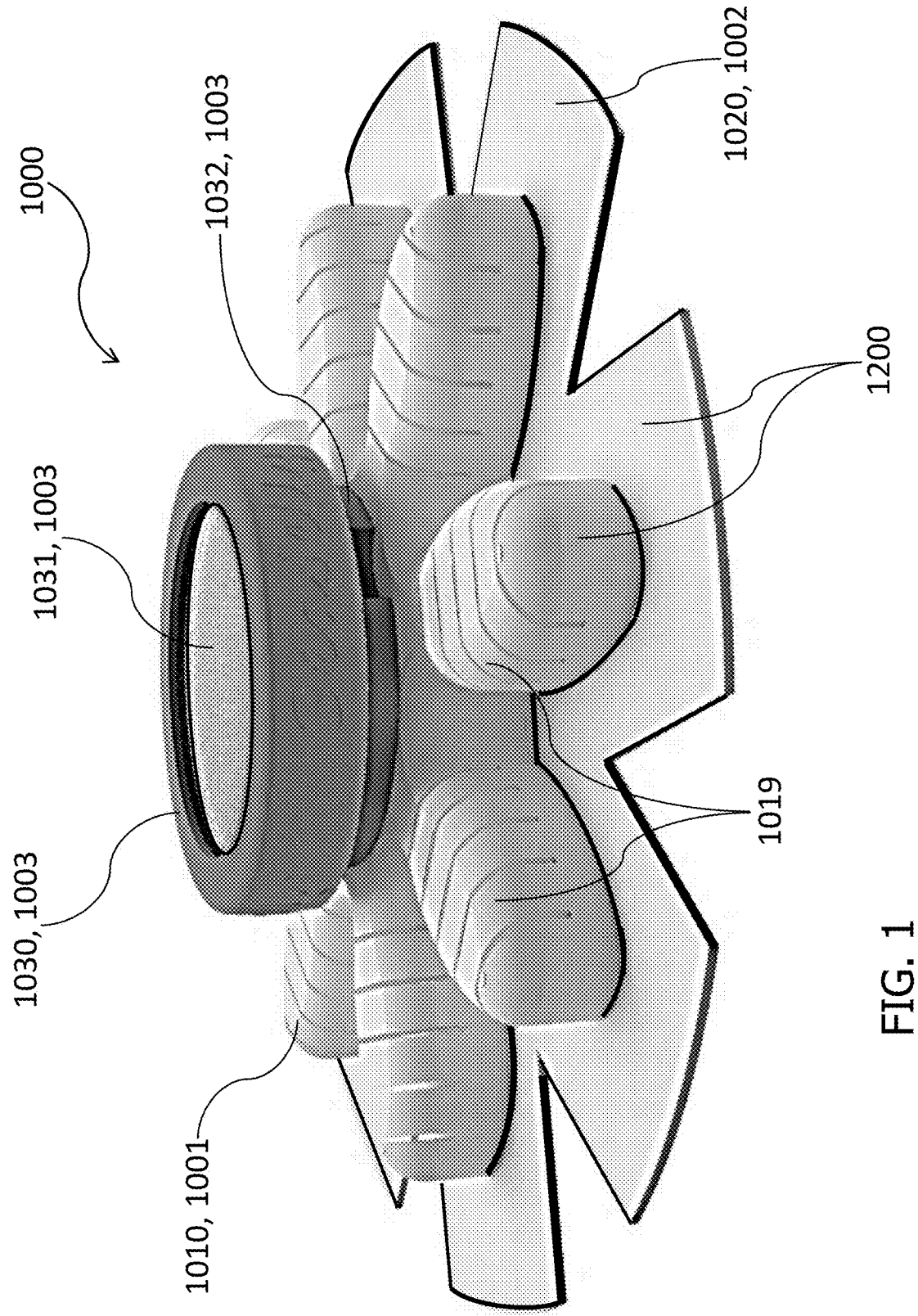
FIG. 1 is a computer-generated perspective view of an example of the present invention's "SeaJelly" soft robotic jellyfish. The inventive soft robotic jellyfish includes an inventively contoured eight-pointed rounded-star-shaped multi-actuator unit (including eight individual radially projecting curved actuators), a propulsive segmented bell unit (including eight individual radially projecting bell-flap sections), and a central electronics unit (including a printed circuit board assembly). The inventive segmented bell roughly corresponds to the eight-lobed bell characterizing certain species of jellyfish.
Figure 2:
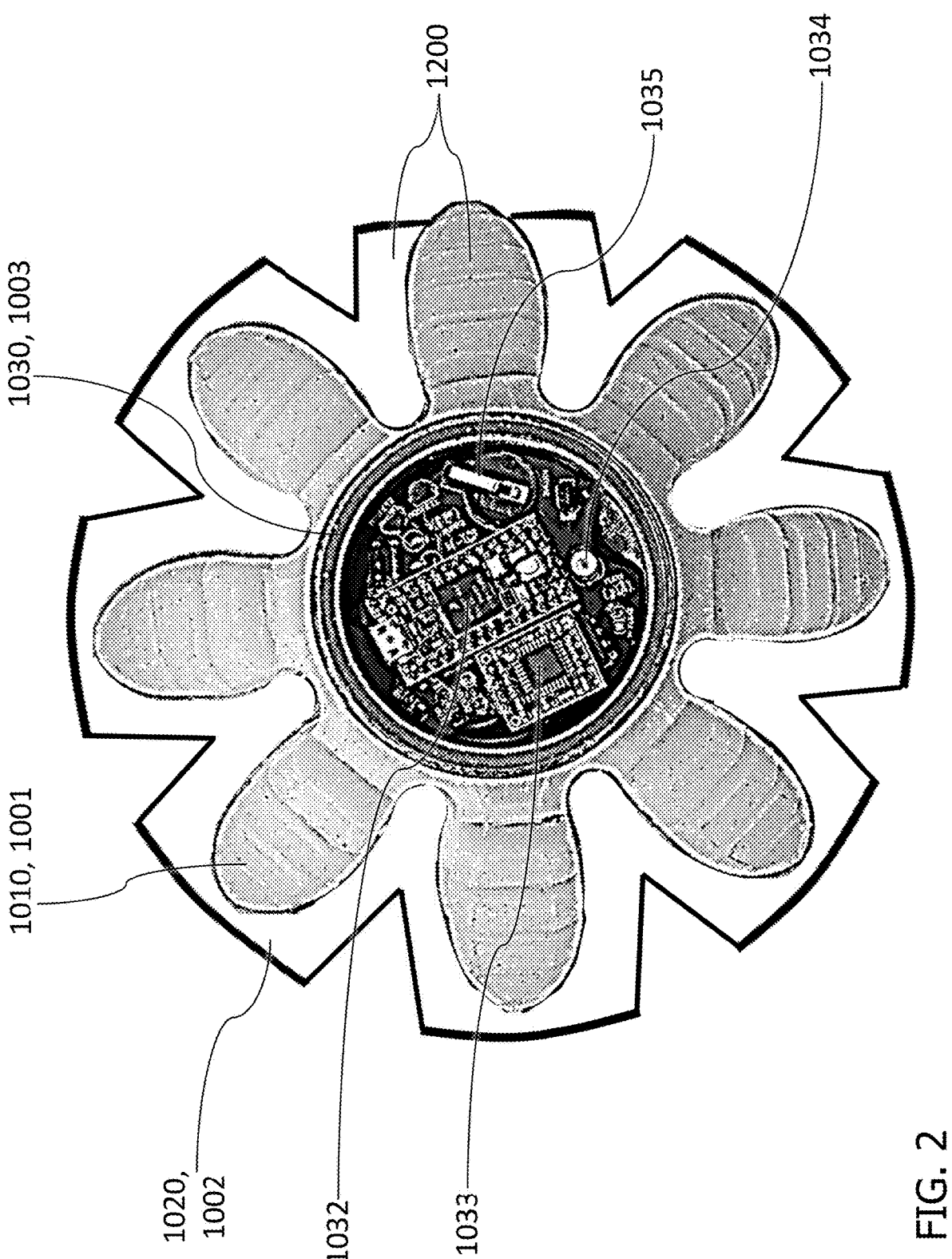
FIG. 2 is a depiction, approximately in top plan view, of an example of an inventive soft robotic jellyfish such as that shown in FIG. 1.

Referring now to FIGS. 1 and 2, the present inventors' SeaJelly® soft robotic jellyfish 1000 is a free-swimming, self-contained, jellyfish-like robotic vehicle. FIG. 1 is an overview depiction, sans electronic circuitry, of a SeaJelly 1000 assembly such as displayed in FIG. 2.

Figures 3, 4:
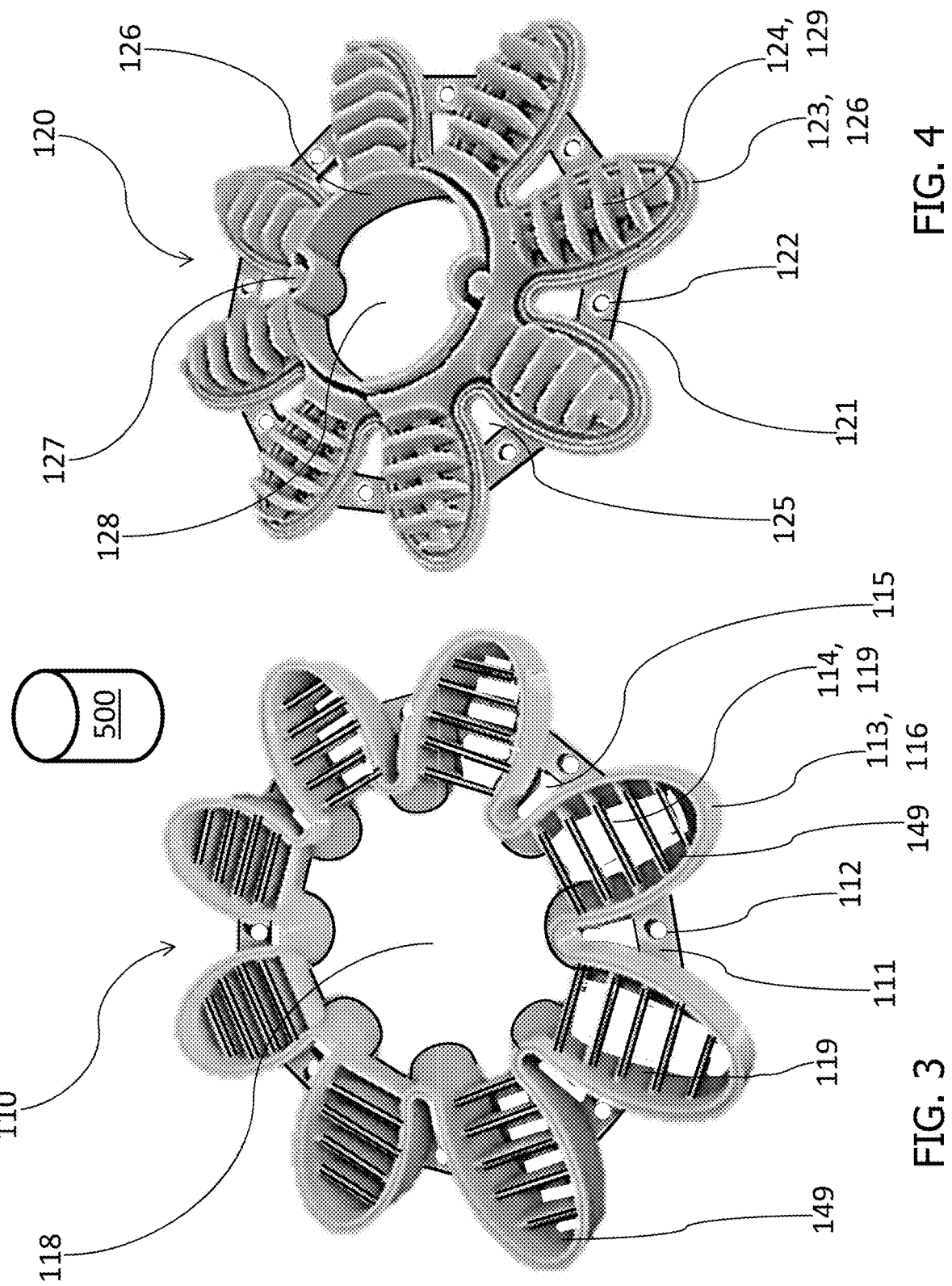
FIG. 3 is a depiction of an embodiment of the upper mold component used for casting the mobility actuators, in accordance with the present invention. The mold component shown by way of example in FIG. 3 is referred to herein as the "upper actuator-mold component."
FIG. 4 is a depiction of an embodiment of the lower mold component used for casting the mobility actuators, in accordance with exemplary practice of the present invention. The mold component shown by way of example in FIG. 4 is referred to herein as the "lower actuator-mold component." The present invention's upper actuator-mold component and lower actuator-mold component are joined in order to cast the SeaJelly's multi-actuator unit.

The three main components of the present invention's SeaJelly soft robotic jellyfish 1000 are the bell actuator unit 1001, the hydrodynamically propulsive segmented bell structure 1002, and the electronics compartment 1003. SeaJelly 1000's components 1001 and 1002 are each characterized by a degree of flexibility. Segmented bell structure 1002 has a "lobed" configuration that includes eight radially directed flap sections 1020. Bell actuator unit 1001 has a correspondingly lobed configuration that includes eight actuators 1010 each having a rounded tip 1011. Each bell actuator 1010 adjoins a separate corresponding bell flap 1020 and is characterized by vertically curved upper exterior edge surfaces 1019, which correspond to vertically curved upper interior edge surfaces 149 of inventive actuator-mold component 110 such as shown in FIG. 3. Each flap 1020 is a passive hydrodynamic flap portion of the segmented bell structure 1002, which is the flat component of the inventive SeaJelly 1000 assembly.

When the SeaJelly bell is in a geometrically planar condition, the eight electromechanical actuators 1010 and the eight fluid-dynamic lobes 1020 share an arrangement characterized by approximately the same equiangular distribution about the geometric center of the SeaJelly bell shape, which parallels a biological jellyfish's anatomy. The SeaJelly propels itself by alternating between a geometrically planar bell mode and a geometrically umbrella-shaped bell mode. As shown by way of example in FIG. 1, the present invention's rounded edges 1019 of actuators 1010 enhance biomimetic aesthetic and perhaps hydrodynamic efficiency. The SeaJelly's eight-lobed bell device 1200 includes actuator unit 1001 (as the active locomotive element of the bell shape 1200) and propulsive flap structure 1002 (as the passive locomotive element of the bell shape 1200). The lower surfaces of the fluid-dynamic bendable flaps 1020 are smooth or even. The actuators 1010 are fixedly situated upon the upper surfaces of the associated fluid-dynamic flaps 1020.

Electronics compartment 1003 includes a 3D-printed screw band 1030, an acrylic lid 1031, and an electronics can 1032. FIG. 2 portray a prototype made by the present inventors using 3D printing techniques. The electronic circuitry in the housing includes a programmable micro controller 1032, a logging system 1033, an RGB LED 1034 (for user feedback), and a battery holder 1035 (for a real-time clock). According to exemplary inventive practice, an integrated silicone gasket seal 1030 obviates the need for a specific discrete O-ring. The soft actuator unit 1001 and the gasket seal 1030 may be fabricated in integral fashion using the same material (e.g., silicone). The inventive method of casting an Ecoflex gasket 1030 onto the electronics canister 1003 allows for cleaner, more consistent sealing than does the previous method of using an O-ring and wax. In the present inventors' STEM classrooms the electronic parts were accessible through hole-mounting to enable assembly with soldering tools and skills at an entry level.

Figure 5:
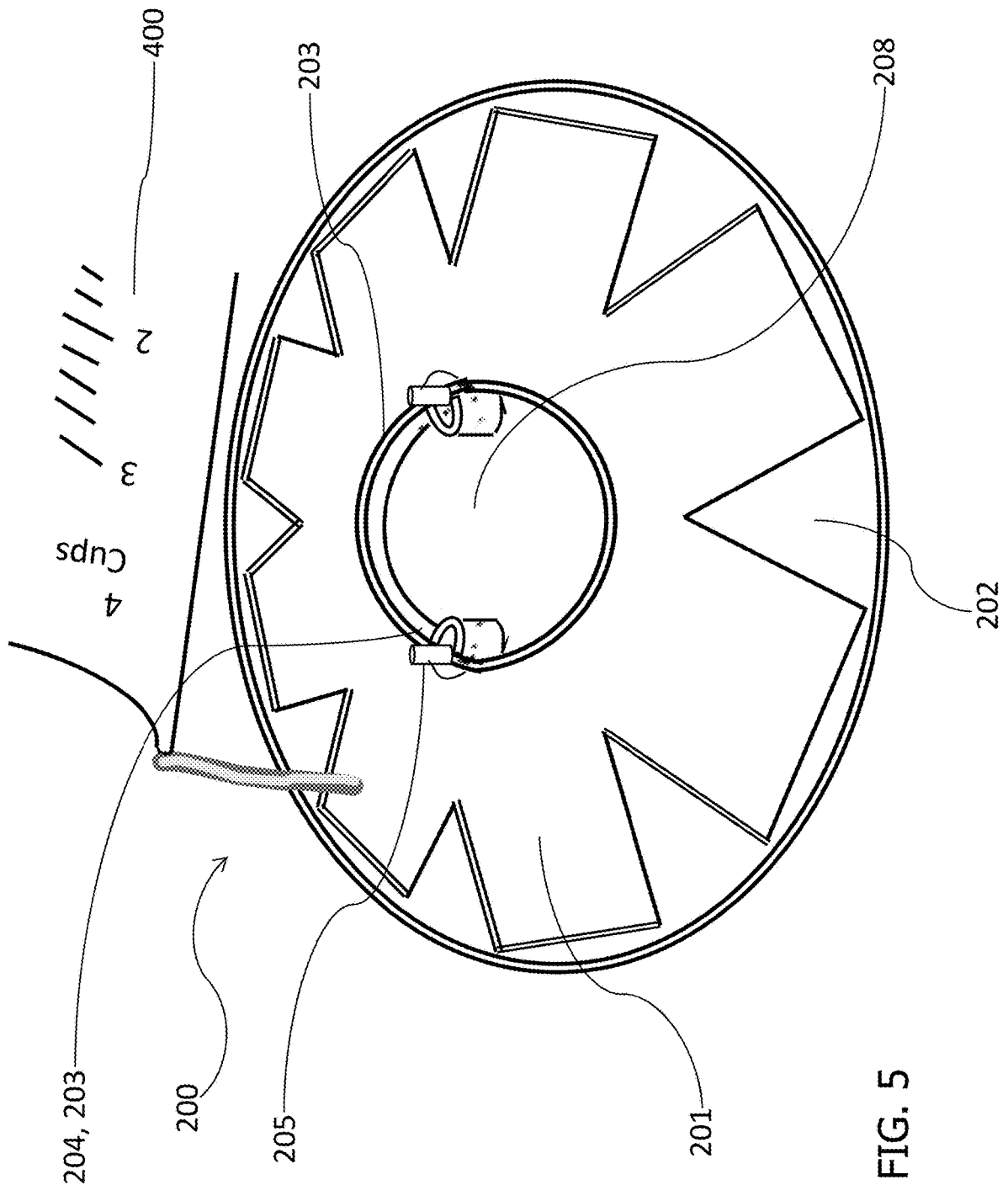
FIG. 5 is a depiction of an embodiment of the mold component used, in accordance with exemplary practice of the present invention, for casting the jellyfish hydrodynamic "bell" (synonymously referred to herein as the jellyfish's hydrodynamic "umbrella"), which represents the propulsive main body of the present invention's SeaJelly soft robotic jellyfish. The mold component shown by way of example in FIG. 5 is the hydrodynamic bell-mold (flap-mold) component. According to exemplary inventive practice, the casted actuators and the casted propulsive bell are combined, along with a centrally located electronics-containing housing, to at least substantially form an inventive soft robotic jellyfish such as illustrated by way of example in FIG. 1 or FIG. 2.

With reference to FIGS. 3 through 16, an embodiment of the present invention's mold apparatus includes an upper actuator-mold component 110 (e.g., FIG. 3), a lower actuator-mold component 120 (e.g., as shown in FIG. 4), and a flap-mold component 200 (e.g., as shown in FIG. 5). According to exemplary inventive practice, each of the three major mold components 110, 120, and 200 is made via a 3D printing process. In the light of the instant disclosure, the ordinarily skilled artisan will understand how processes, material, and techniques known in the 3D-printing arts can be effectuated for fabricating the present invention's mold components 110, 120, and 200. For instance, mold components 110, 120, and 200 can be printed in PETG (polyethylene terephthalate glycol), which was frequently used by the present inventors in making their prototypical mold components. The mold components can be printed in PETG or other suitable 3D-printing materials, and can be printed in same or different 3D-printing materials.

Figure 8:
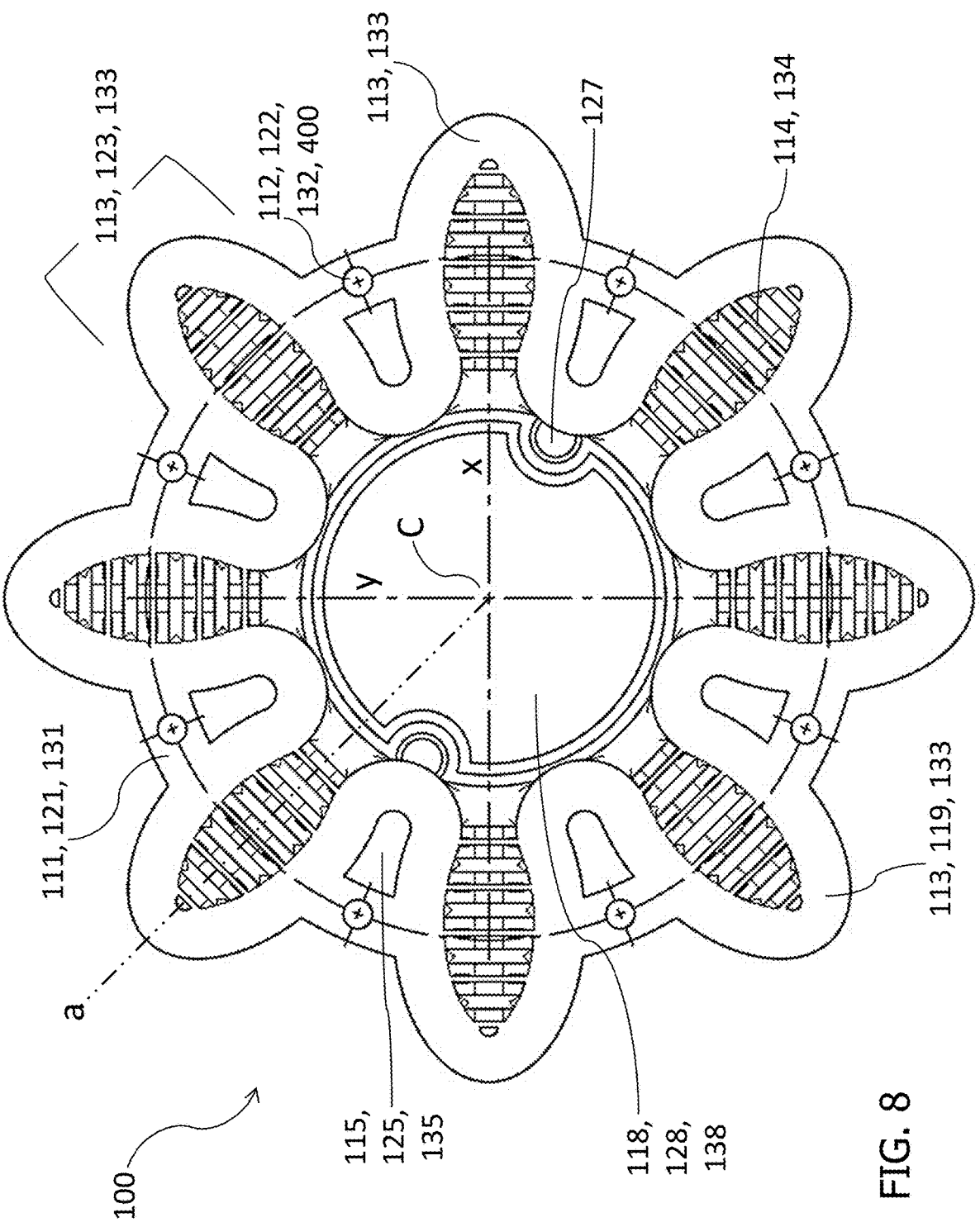
FIG. 8 and FIG. 9 are the same top plan view of an inventive example, such as shown in FIG. 6 or FIG. 7, of a two-part multi-actuator mold assembly formed by coupling of the upper actuator-mold component and the lower actuator-mold component.
Figure 9:
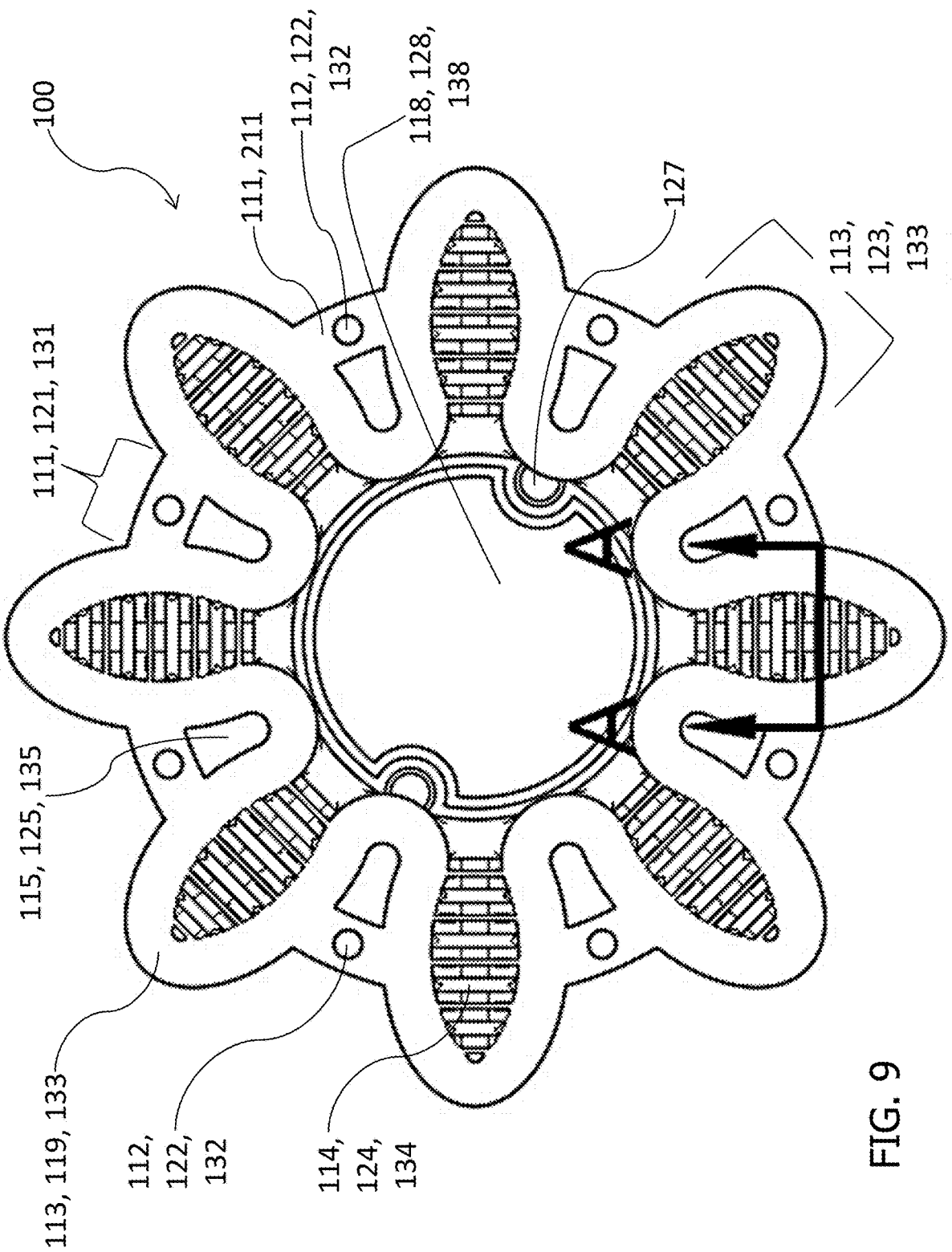
Figure 10:
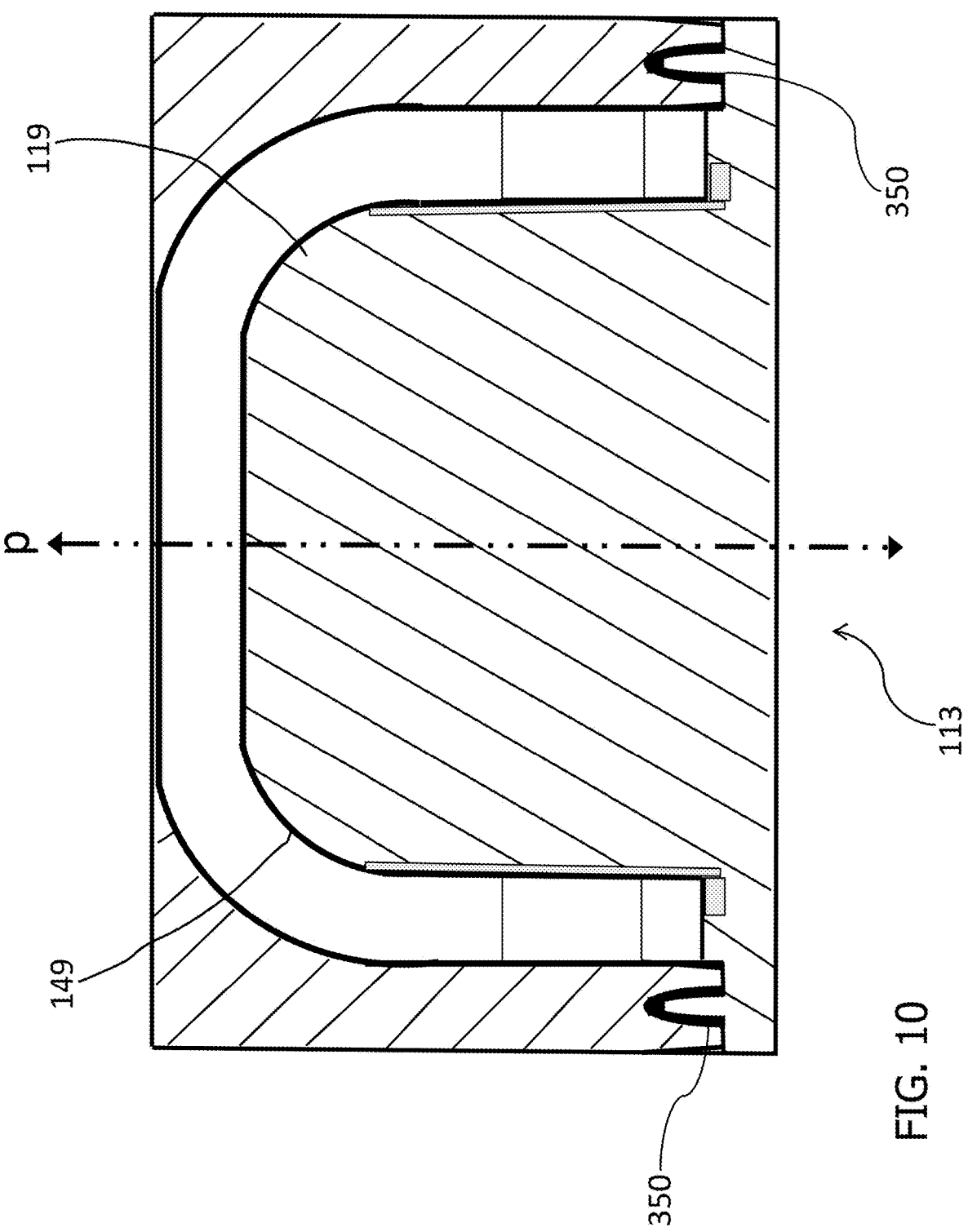
FIG. 10 is a partial cross-sectional view, taken along section A-A in FIG. 8, of an example of an actuator mold configuration in accordance with the present invention.

Particularly as shown in FIGS. 3, 4, 7, 8, 9, 11, and 12, upper actuator-mold component 110 and lower actuator-mold component 120 are approximately equivalent in planview profile; that is, actuator-mold components 110 and 120 have matching planar peripheries. Each actuator mold-component similarly describes an open-center rounded-point star shape having a geometric center (or axis) C, perpendicular coplanar geometric axes x and y, a circular central void, and eight rounded star points. Upper actuator-mold component 110 includes eight radial projections 113, each projection 113 having a rounded tip 116 and a slotted interior 114 formed by parallel vertical flat thin mold sections 119, and characterized by a geometric axis a that passes through center C. FIG. 10 shows a vertical geometric plane p in which geometric axis a lies. Upper actuator-mold component 110 further includes eight circularly arranged attachment segments 111.

Each attachment segment 111 has a through-hole 112, is situate between two radial projections 113, and connects the two radial projections 113. Each through-hole 112 is intermediate (e.g., halfway between) the two junctures 190 defined by the linking of the attachment segment 111 with the corresponding radial projections 113 on opposite sides of the attachment segment 111. Upper actuator-mold component 110 defines eight openings 115, each delimited by an attachment segment 111. In addition, each projection 111 is characterized around at least a portion of its upper periphery (e.g., at its tip-end and sides) by curved inside edge surfaces 149, which are also shown in FIG. 10. Inside edge surfaces curve upwardly inward toward vertical geometric plane p. The present invention's curved internal pocket walls 149 reduce stresses during demolding and inflation.

Figure 6:
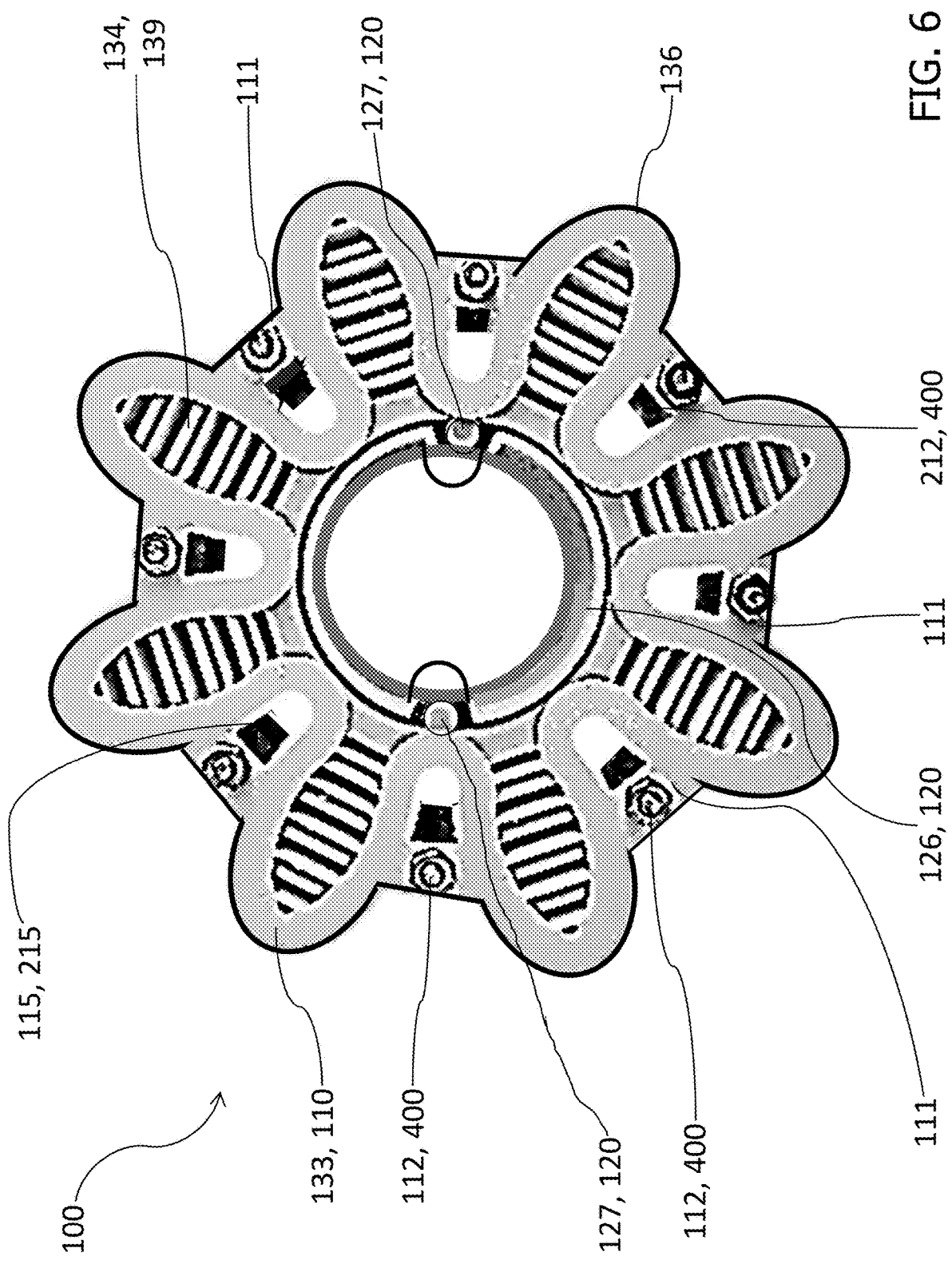
FIG. 6 is a depiction, approximately in top plan view, of an inventive example of a two-part multi-actuator mold assembly, formed by coupling of the upper actuator-mold component (such as shown in FIG. 3) and the lower actuator-mold component (such as shown in FIG. 4). The upper and lower actuator-mold components may thus be used in combination for casting the inventively contoured eight-pointed rounded star-shaped multi-actuator unit of an inventive soft robotic jellyfish.

Lower actuator-mold component 120 includes eight radial projections 121, each having a rounded tip 126 and a slotted interior 124 formed by parallel vertical flat thin mold sections 129, and characterized by a geometric axis a that passes through center C. Lower actuator-mold component 120 further includes eight circularly arranged attachment segments 121. Each attachment segment 121 has a through-hole 122, is situate between two radial projections 123, and connects the two radial projections 123. Lower actuator-mold component 120 defines eight openings 125, each opening 125 delimited by an attachment segment 121. Two pump inlets 127 (to the fluid distribution channels inside the actuator-mold projections) are situate on opposite sides of center C in lower actuator-mold component 120, as shown in FIGS. 6, 9, and 12.

Figure 11:
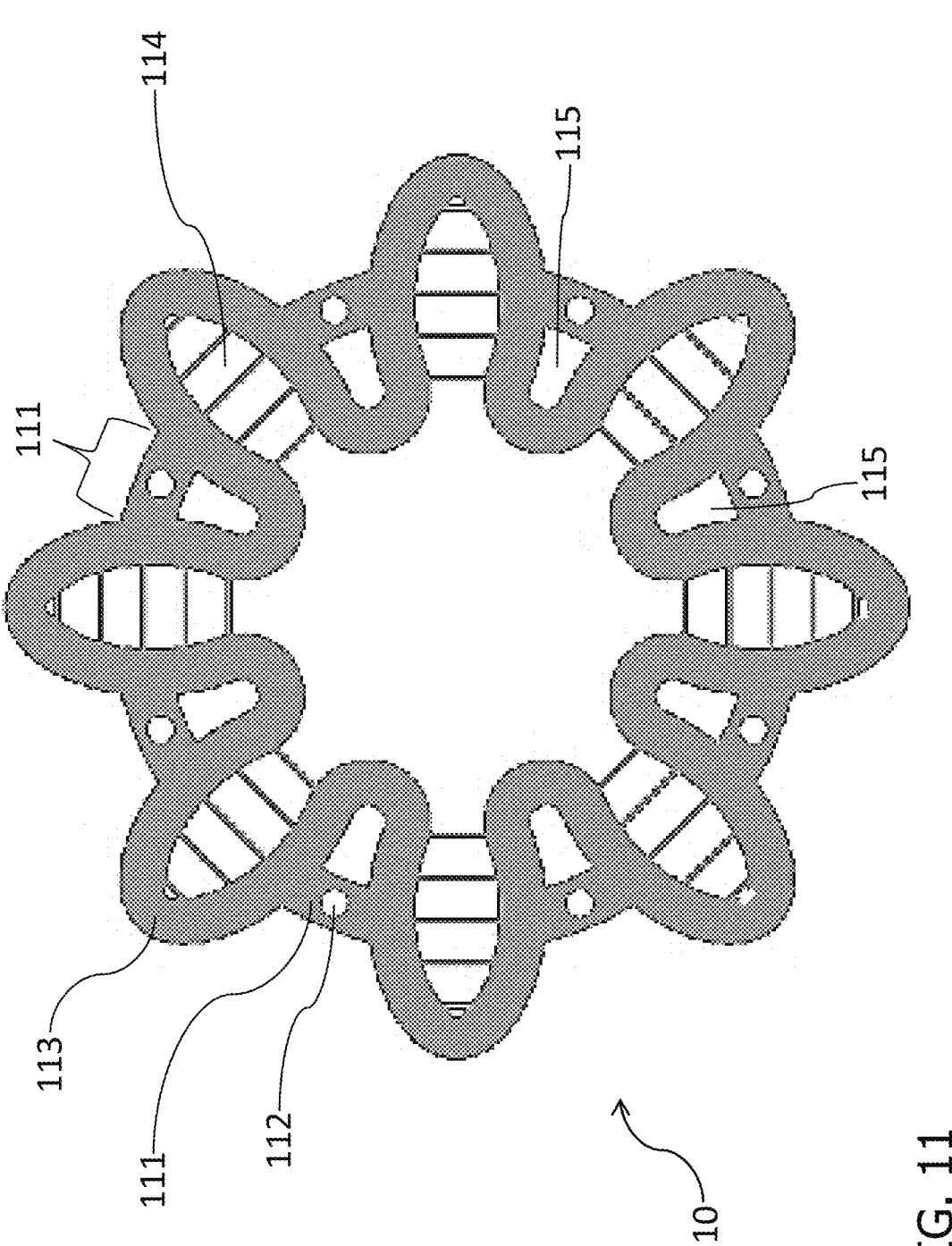
FIG. 11 is a top plan view of an inventive embodiment, such as shown in FIG. 3, of an upper actuator-mold component. The depicted upper actuator-mold component of FIG. 3 is inverted vis-à-vis the depicted upper actuator-mold component of FIG. 6 and the respective depicted upper actuator-mold components of FIGS. 7, 8, 9, and 11.
Figure 12:
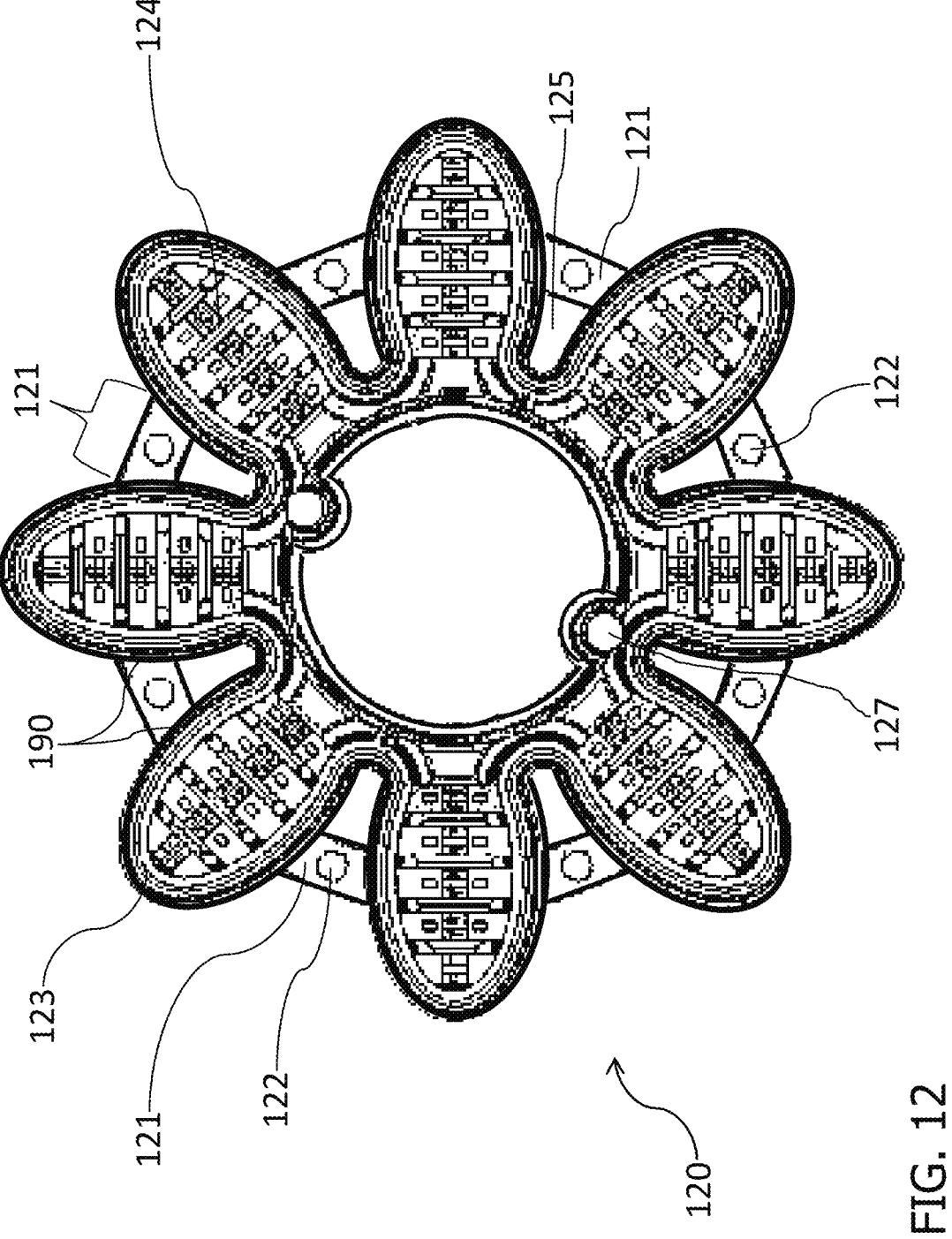
FIG. 12 is a top plan view of an inventive embodiment, such as shown in FIG. 4, of a lower actuator-mold component.
Figures 13, 14, 15, 16:
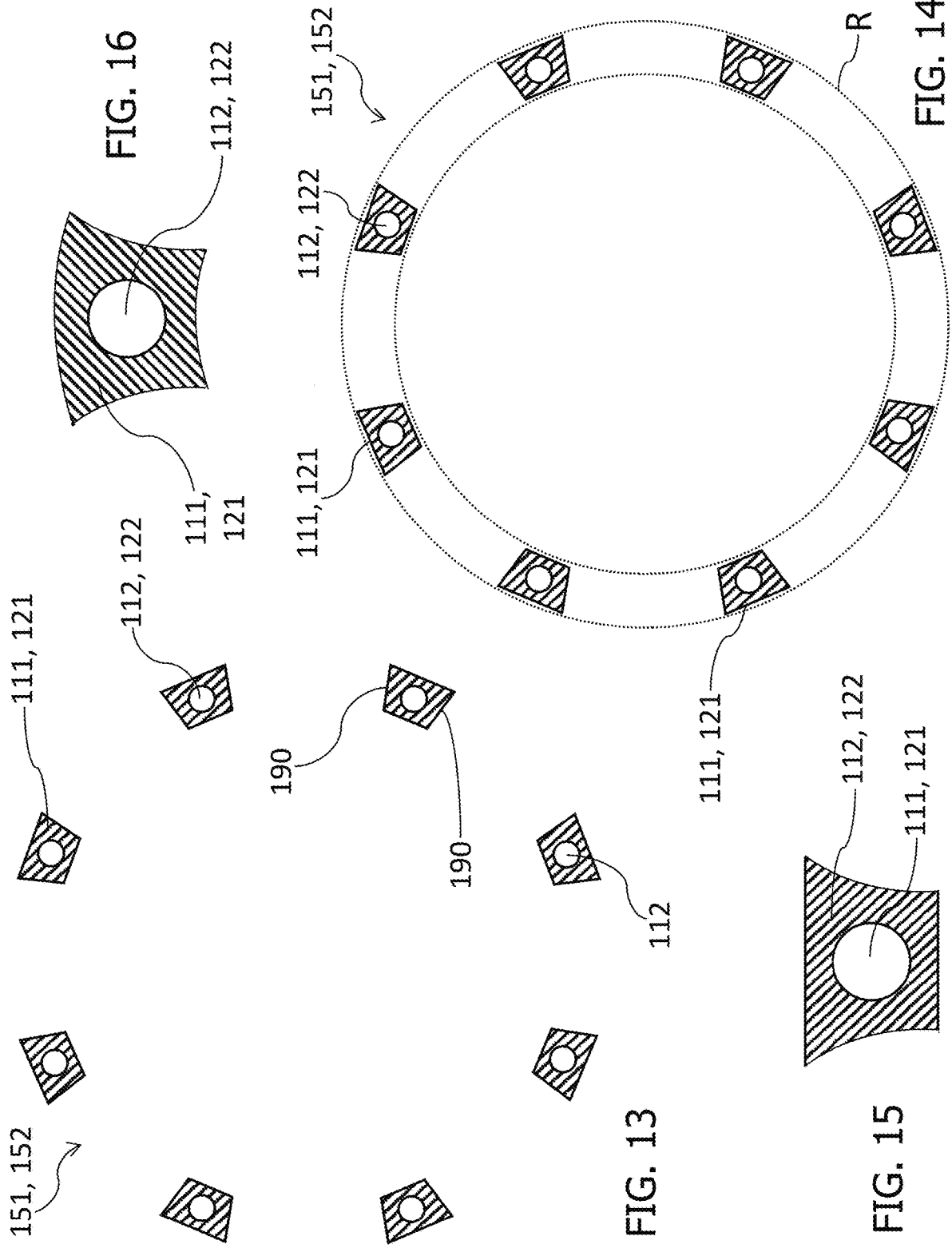
FIGS. 13 and 14 are the same plan view of an inventive embodiment of a group of apertured planar attachment members such as shown as included in FIG. 11 and in FIG. 12.
FIGS. 15 and 16 show two different inventive embodiments of an attachment member characterized by a degree of curvature in conformance with the actuator-mold component of which the attachment member is an integral part.

For illustrative purposes, the circularly arranged attachment segments illustrated in FIGS. 13 and 14 may be considered to represent either the eight attachment segments 111 of upper actuator-mold component 110 (such as shown in FIG. 11), or the eight attachment segments 121 of lower actuator-mold component 120 (such as shown in FIG. 12). Each set of apertured attachment segments 111/121 describes a compression ring 151/152 that is partially integrated with the actuator-mold component inclusive of the compression ring, wherein the attachment segments are equally (equidistantly) spaced about the compression ring; equivalently expressed, the attachment segments are equiangularly spaced about the geometric center of the ring. Accordingly, attachment segments 111 form a ring 151, as part of upper actuator-mold component 110, and attachment segments 121 form a ring 152, as part of lower actuator-mold component 120. Attachment segments 111 and 121 are alignedly combined to form a ring 153, as part of the overall actuator mold 100. FIGS. 15 and 16 illustrate, by way of example, how an attachment segment can be characterized by a degree of in-plane perimetric curvature in conformity with the shape of the corresponding actuator-mold component.

Bell mold component 200, also referred to herein as the "skirt" mold component 200, is used for casting the segmented hydrodynamic bell structure 1002 of the inventive SeaJelly 1000. Skirt mold component 200 is configured to have a central opening 208 and a mold cavity 201 that is delimited by peripheral triangular boundaries 202 and a central circular boundary 203, which includes two opposite recessed portions 204 for accommodating respective cores 205 for integrated tubes. To cast hydrodynamic bell structure 1002, a castable silicone material (such as an EcoFlex material) 400 is poured into the skirt mold cavity 201 (e.g., filling or substantially filling cavity 201) and allowed to completely and undisturbedly cure. The bell "skirt" 1002 thus produced is combined with the actuator unit 1001, which has been similarly produced using a castable material 400 in association with the actuator-mold assembly 100, to form the SeaJelly 1000's eight-lobed bell device 1200, in which the SeaJelly 1000's electronics compartment 1003 is to be centrally incorporated.

The upper actuator mold component 110's central cylindrical void 118 and the lower actuator mold component 120's central cylindrical void 128 are approximately equal in diameter. Upper actuator-mold component 110 and lower actuator-mold component 120 are made to be configuratively and dimensionally complementary so that they can be coaxially coupled with each other whereby the respective lobes, voids, and contours are congruous, thereby forming an actuator-mold assembly 100 such as depicted in FIGS. 6 through 9. Projections 111 and 121 align to form projections 131 each having a rounded tip 136. Central voids 118 and 128 align to form central void 138. Openings 115 and 125 coaxially align to form openings 135. Attachment segments 111 and 121 align to form attachment segments 131, wherein partial-length through-holes (e.g., bolt holes) 112 and 122 coaxially align to form full-length through-holes (e.g., bolt holes) 132.

As shown in FIGS. 6 and 8, fasteners 400 (e.g., nuts-and-bolts hardware or other commercially available hardware) engage through-holes 132, which are formed by axial alignment of through-holes 112 and 122 of upper actuator-mold component 110 and lower actuator-mold component 120, respectively. For instance, the bolts pass through the corresponding through-holes. Actuator projections 113 and 123 combine to form eight actuator projections 133 having respective fluid chambers 139. In each fluid chamber 133, the slotted interiors 114 and 124 of the respective actuator projections 113 and 123 mesh to form a slotted interior 134 having fluid distribution channels 139, which is described by the meshing of the flat parallel vertical cross-axis members 118 and 128 inside the respective slotted interiors 114 and 124.

The resultant union of the upper and lower actuator mold components, using fasteners 400 that are symmetrically arranged about center C, exerts a self-contained clamping force for affording sealing pressure that is evenly distributed about center C in a circumferential direction. In accordance with exemplary inventive practice, the bolted connection between mold pieces reduces material waste and improves repeatability when casting. The bolt pattern evenly clamps together the upper actuator-mold component 110 and the lower actuator-mold component 120 and provides leverage points which streamline the demolding process, helping to preserve the mold for continued reuse.

Figure 7:
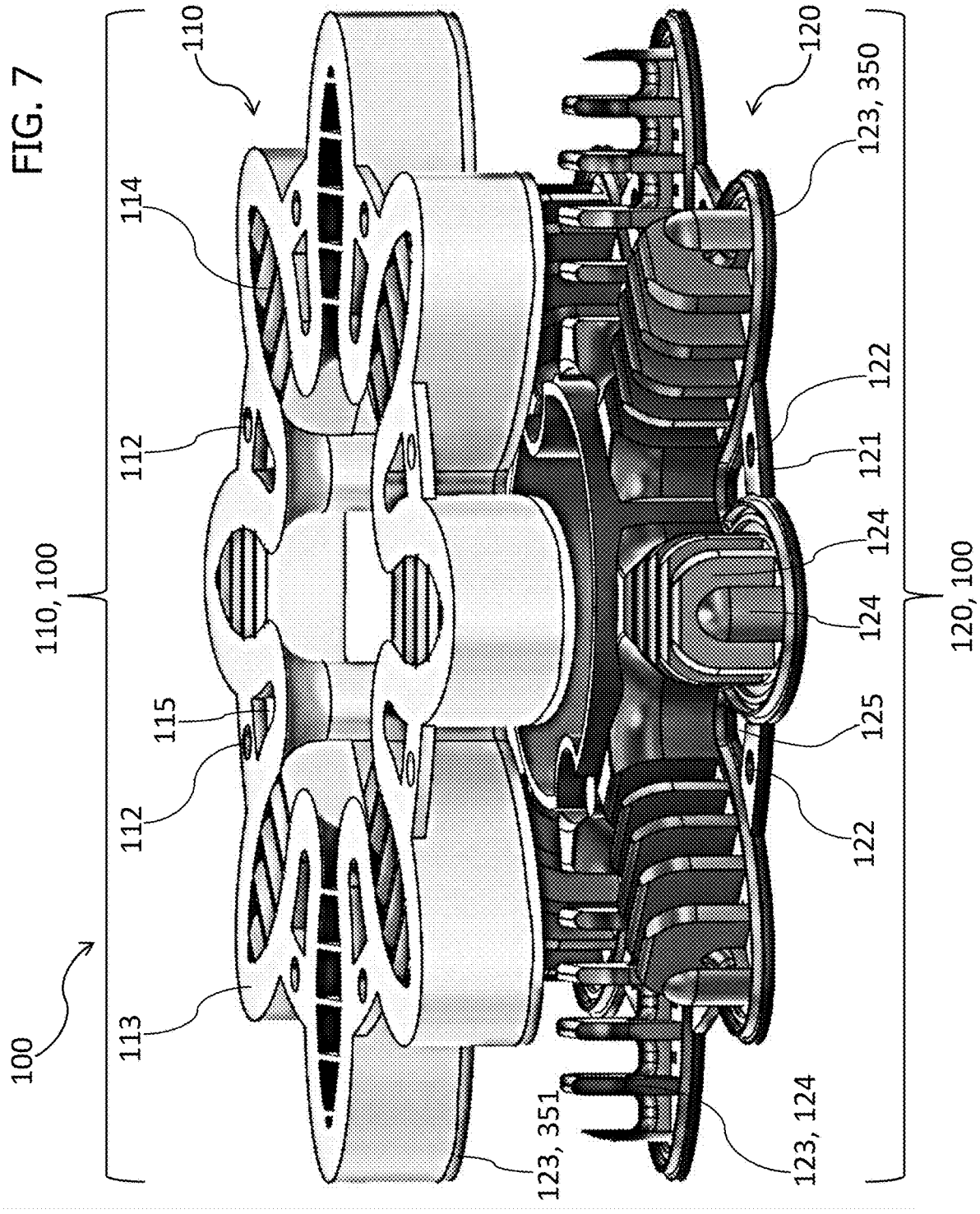
FIG. 7 is a computer-generated exploded perspective view of an inventive example, such as shown in FIG. 6, of the upper actuator-mold component and the lower actuator-mold component, which are coupled to form a two-part multi-actuator mold assembly.

In addition, an interference fitting between actuator-mold components 110 and 120 may be provided by one or more structural shapes such as cleat 350 shown by way of example in FIG. 10, which is a partial cross-sectional view of FIG. 9. As shown in FIG. 7, a perimetric cleat 350 extends around the bottom edge perimeter of each mold projection 123, and a perimetric cleat socket 351 extends around the bottom edge perimeter of each mold projection 113. An interference fit of this kind, wherein a perimetric cleat and a perimetric socket fit together, may serve to advance certain processing attributes.

Moreover, clamping together of actuator-mold components 110 and 120, according to the present invention, does not require any adhesives, may extend mold life, and may facilitate STEM classroom operations. An additional benefit of the present invention's enhanced attachment of actuator-mold components via a ring-and-fastener configuration is an ability to expedite 3D printing because less material is used by virtue of the openings bordered upon by the aperture attachment segments. A SeaJelly actuator unit 1001 can be molded and cured by pouring silicone (e.g., mixed EcoFlex castable silicone) or other suitable fluid material into the actuator-mold assembly 100 (e.g., filling or substantially filling the spaces inside actuator-mold assembly 100). A release agent 500 such as shown in FIG. 3 may be used to prevent a SeaJelly part that is being molded from sticking to the associated 3D-printed mold component.

The two 3D-printed actuator-mold components—viz., upper actuator-mold component 110 and lower actuator-mold component 120—are joined and thus jointly implementable for casting SeaJelly 1000's actuator unit 1001. Upper actuator-mold component 110 has eight upper actuator projections 113. Lower actuator-mold component 110 has eight lower actuator projections 123. Flap-mold component 200 is used for casting SeaJelly 1000's flap structure 1002. When upper actuator-mold component 110 and lower actuator-mold component 120 are coupled to form actuator-mold assembly 100, the eight upper actuator components 113 are in vertically aligned one-to-one correspondence with the eight lower actuator components 123. As molded using actuator-mold assembly 100, the SeaJelly 1000's actuator unit 1001 will have a central cylindrical void accommodative of SeaJelly 1000's electronics compartment 1003, a cylindrical portion of which fits inside the central open space of SeaJelly 1000's actuator unit 101.

Particularly with reference to FIGS. 7 and 10, exemplary inventive practice creates actuators that are vertically rounded along the top edges. Cavities or pockets are inventively molded to form such curved interior walls in silicone fluid chambers. The present invention's reduction of sharp (e.g., rectilinear or square-shaped) corners in these chambers reduces stress concentrations during demolding and inflation (when operating). Interference cleat 350, which furthers sealing, is taller than the corresponding socket 351, and allows the mold parts to index during assembly. Once the actuator-mold components are clamped with the compression bolts, the cleat engagement creates a seal to contain the fluid silicone compound during curing. This interference sealing, combined with the fastener clamping, can obviate the use of adhesives, and can allow the molds to be more reusable and leak-tolerant, even with poor surface qualities that sometimes characterize 3D-printed parts.

Figure 17:
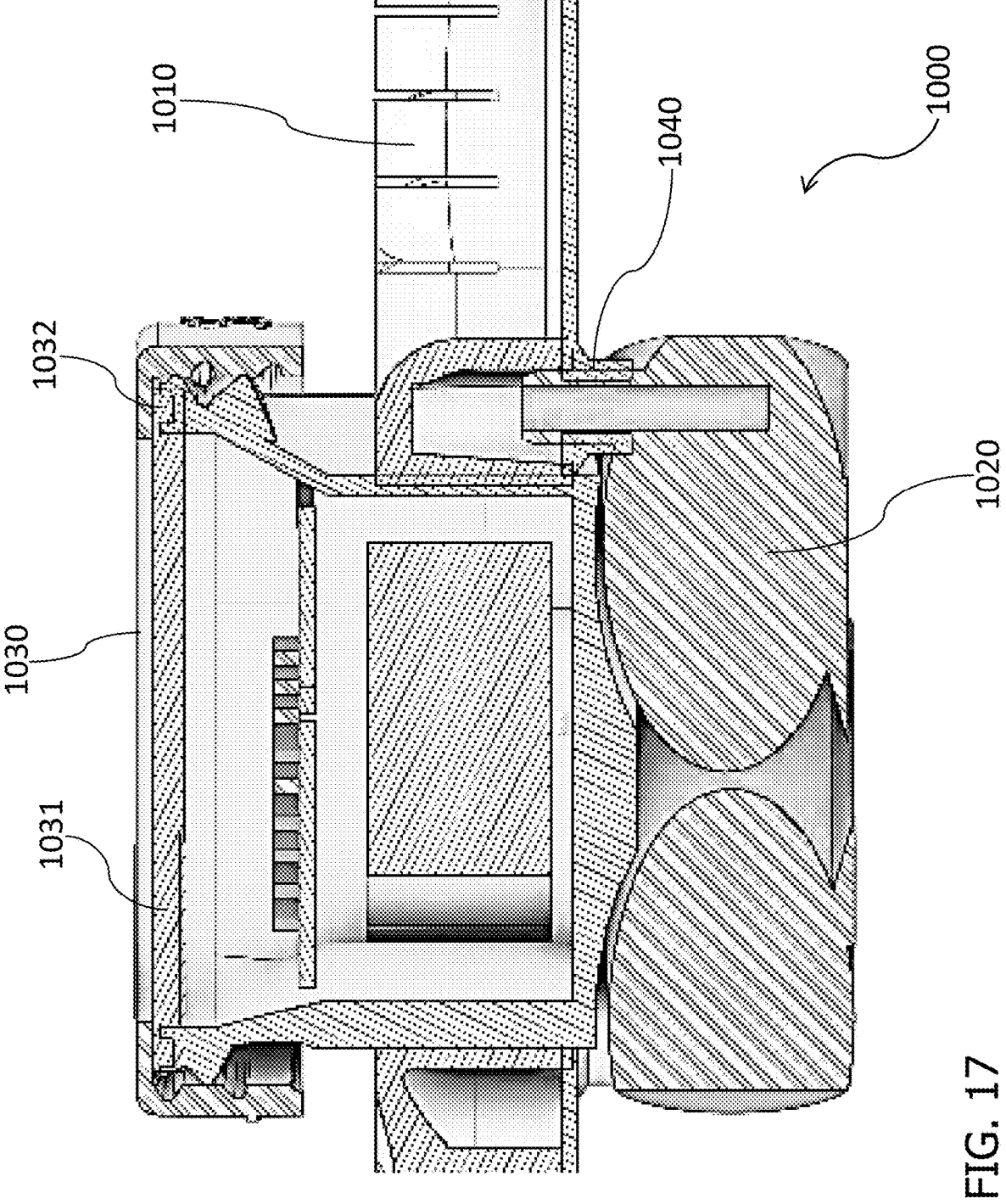
FIG. 17 is a partial cross-sectional elevation view of an example of an inventive soft robotic jellyfish such as that shown in FIG. 1 or FIG. 2, in particular illustrating the core structure of the inventive soft robotic jellyfish.
Figure 18:
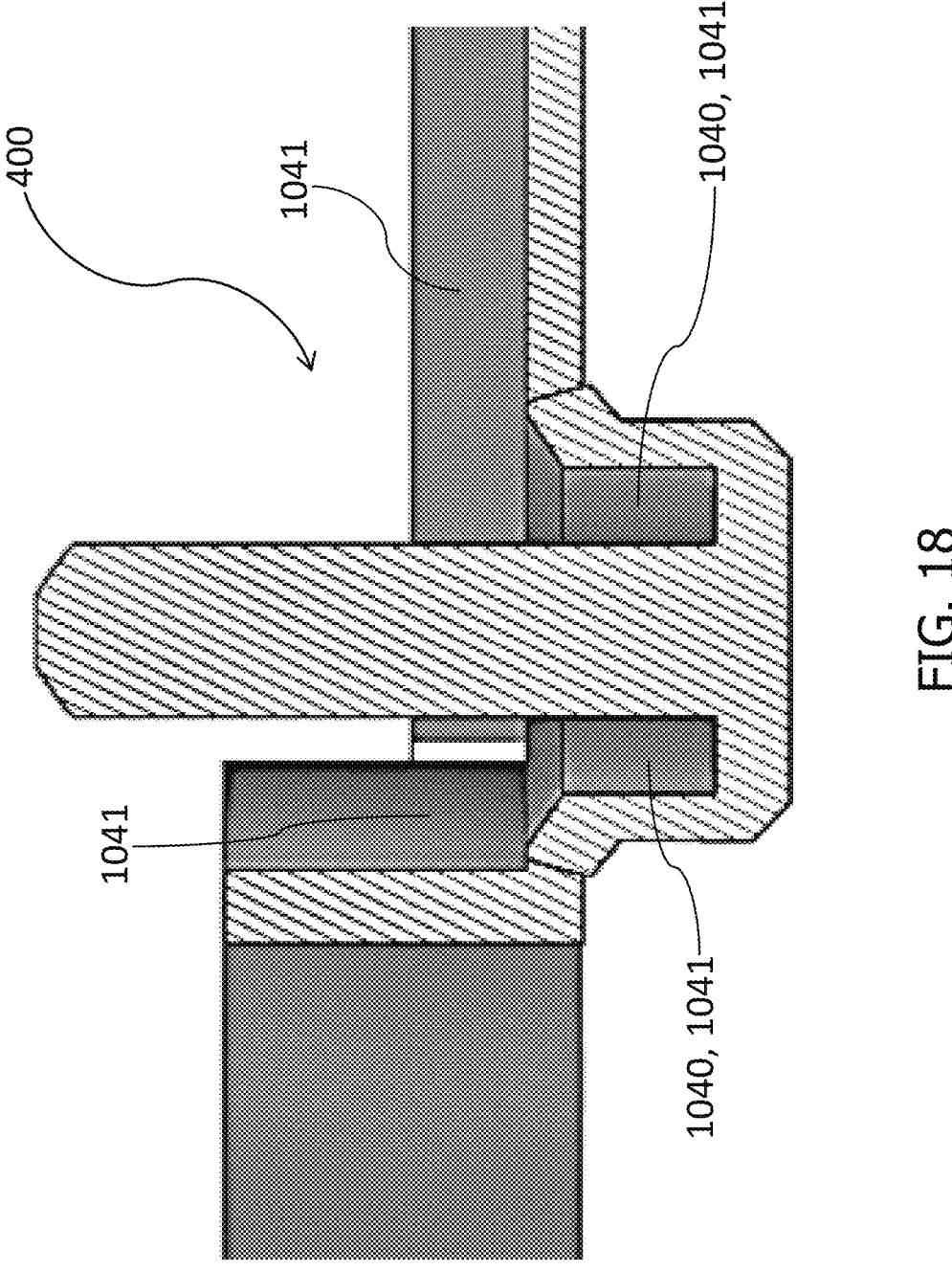
FIG. 18 is a partial cross-sectional elevation view of an example of an inventive soft robotic jellyfish such as that shown in FIG. 1 or FIG. 2, in particular illustrating a removable integrative tube mold suitable for introduction of a liquid material (e.g., silicone) into the chambers and passageways of an inventive actuator mold assembly.
Figure 19:
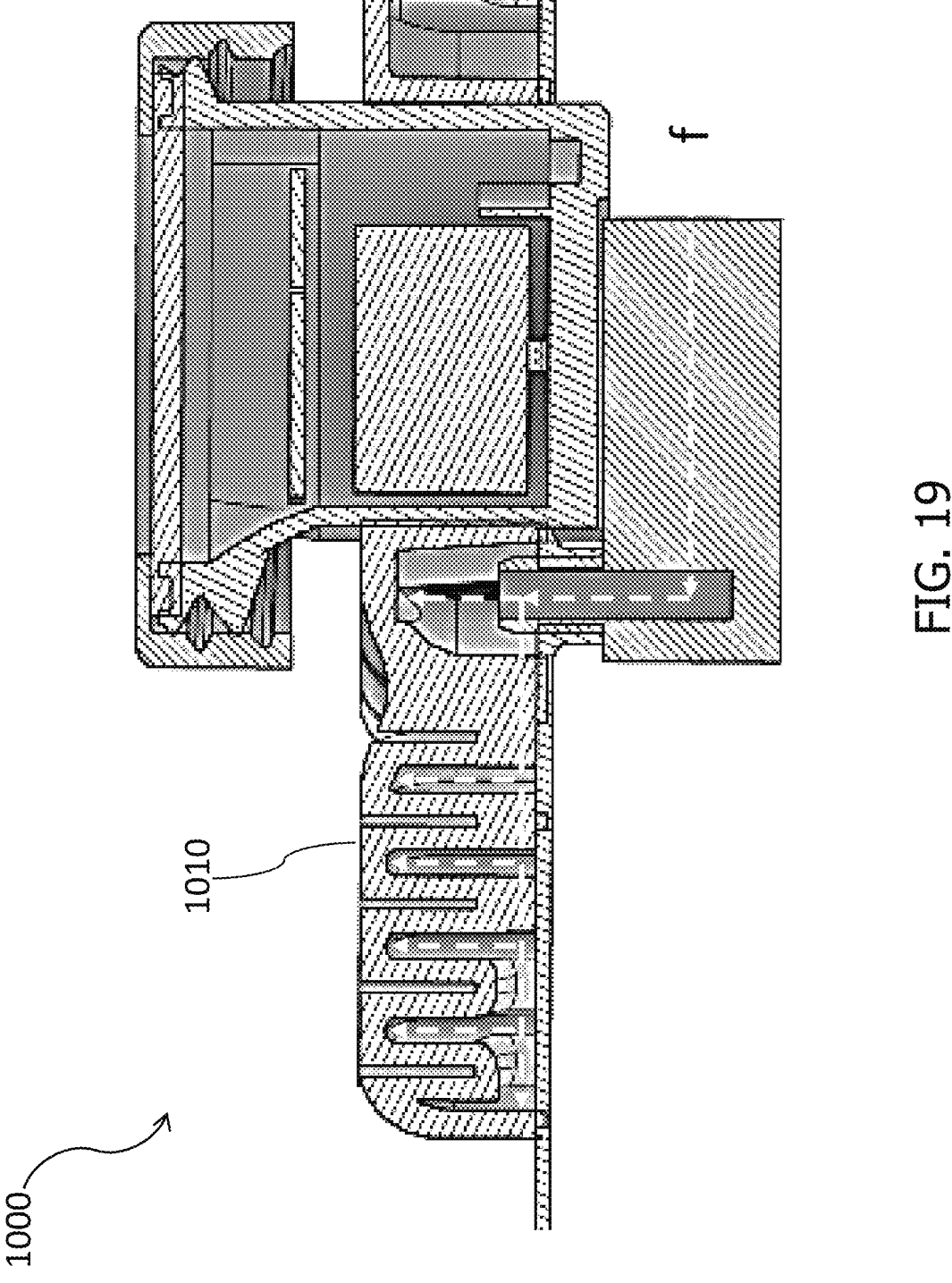
FIG. 19 is a partial cross-sectional elevation view, similar to the view of FIG. 17, of an example of an inventive soft robotic jellyfish such as that shown in FIG. 1 or FIG. 2, in particular illustrating the flow of water through the chambers and passageways of each actuator for continually reconfiguring the actuator unit between an umbrella-like state and a flat state, thereby motivating the inventive soft robotic jellyfish.

With reference to FIGS. 17 through 19, some inventive embodiments provide a novel combination in terms of pump orientation and cast silicone (e.g., EcoFlex) tubes, thereby allowing for direct pump implementation and reducing "bill of materials" and assembly complexity. FIG. 17 shows an actuator 1010 interface to water pumps 1020, and a clamping assembly of lid, screw band, and electronics housing. Integrated pump tube 1040 (also shown in FIG. 18) is part of the skirt mold 200, and is beneficial at least insofar as reducing the bill of materials and the number of assembly steps. Integrated cast gasket 1032 utilizes the body silicone material to seal water out without adding a part to the bill of materials. Locations 1041 are the areas where the silicone is poured. FIG. 18 shows a removable integrated tube mold 400, which serves purposes including reducing required print material/time, and staging demolding to avoid ripping. FIG. 19 illustrates the actuator unit 1001 (one actuator 1010 shown) and the pump 1020 interface of SeaJelly 1000. Directional arrow f indicates, when the pump is on, the flow of water through the pump, the distribution channels, and the fluid chambers. Elastic relaxation reverses the water flow and flattens the actuator.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. For instance, it will be apparent to the ordinarily skilled artisan who reads the instant disclosure that various embodiments of the present invention can be practiced wherein eight, fewer than eight (e.g., at least three), or greater than eight radially projecting portions of a molding apparatus correspond to the same number of radially projecting portions of a subject animal. Various omissions, modifications, and changes to the principles disclosed herein may be made by one skilled in the art without departing from the true scope and spirit of the present invention, which is indicated by the following claims.

What is claimed is:

1. A method for casting an object, the method comprising coupling two mold components, and introducing a castable material into the coupled said two mold components, wherein:

said two mold components have matching stelliform peripheries;

each said mold component is characterized by a geometric center and includes at least three mold projections;

said at least three mold projections correspond to the equiangular points of a stellar geometry;

each said mold component further includes at least three attachment members defining an annulus characterized by said geometric center;

said at least three attachment members are spaced equidistantly about said annulus;

each said attachment member connects two said mold projections and has a through-hole provided therein;

said coupling of said two mold components includes congruously combining said two mold components wherein the respective said geometric centers, mold projections, and through-holes are in alignment.

2. The method for casting an object as recited in claim 1, wherein said congruously combining of said two mold components includes associating a fastener with each aligned pair of the respective said through-holes.

3. The method for casting an object as recited in claim 1, wherein:

a first said mold component has a cleat along at least a portion of an edge periphery of the first said stelliform mold component;

a second said mold component has a socket along at least a portion of an edge periphery of the second said mold component;

said congruously combining of said two mold components includes adjoining said cleat and said socket to form a seam representing an at least substantially fluid-tight seal.

4. The method for casting an object as recited in claim 1, wherein said introducing of a castable material into the coupled said two mold components is performed so that the cast said object is configured for use as part of a soft robot that mimics a biological entity.

5. A method for casting an object, the method comprising:

congruously coupling two approximately planar mold components having matching stelliform peripheries, thereby forming a mold assembly; and introducing a castable material into said mold assembly;

wherein each said mold component is characterized by a circular central void and a geometric center and includes at least three mold projections and at least three attachment segments, said at least three mold projections radiating from said geometric center and spaced equidistantly about said circular central void, said at least three attachment segments separated from each other by said mold projections and defining a discontinuously segmented annulus that is characterized by said geometric center and is diametrically greater than the circular central void, each said attachment segment interposed directly between and connecting two said mold projections, said at least three attachment segments being spaced apart equidistantly about said discontinuously segmented annulus and radially outwardly distanced from said circular central void wherein the number of said at least three attachment segments equals the number of said at least three mold projections, each said attachment segment having a through-hole provided therein;

wherein the congruous coupling of said two mold components includes:

aligning the respective said circular central voids, geometric centers, mold projections, attachment segments, and through-holes;

engaging each aligned pair of the respective said through-holes with a fastener wherein each said fastener passes through both of the aligned said through-holes, and wherein said fasteners are symmetrically arranged about said geometric center in furtherance of a clamping force exerted by said two mold components with respect to each other that is evenly distributed about the aligned said geometric centers.

6. The method for casting an object as recited in claim 5, wherein the congruous coupling of said two mold components includes aligning said circular central voids of the coupled said two mold components to form an approximately cylindrical central hollow in said mold assembly.

7. The method for casting an object as recited in claim 5, wherein each said mold projection includes a slotted interior formed by at least two parallel mold sections, and wherein the congruous coupling of said two mold components includes aligning the respective said mold projections so as to mesh the respective said slotted interiors of each aligned pair of said mold projections.

* * * * *